(12) United States Patent
Horigome (10) Patent No.: US 6,295,135 B1
(45) Date of Patent: *Sep. 25, 2001

(54) RELEASE OF BUSY SIGNAL WHEN FREE CAPACITY OF A RECEPTION BUFFER EXCEEDS A PREDETERMINED AMOUNT

(75) Inventor: Hideo Horigome, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/901,262

(22) Filed: Jul. 28, 1997

(30) Foreign Application Priority Data

Aug. 1, 1996 (JP) .................................................. 8-219268

(51) Int. Cl.[7] .................................................. G06K 15/00
(52) U.S. Cl. ...................... 358/1.15; 358/1.16; 358/1.13; 358/1.14
(58) Field of Search ................................... 395/114, 849, 395/872; 455/68; 358/1.15, 1.13, 1.14, 1.16, 1.17, 1.1, 434, 435, 436, 437, 438, 439, 404, 407, 444, 468; 710/17, 19, 52, 29, 56, 57; 709/228, 227, 233, 234, 237; 347/3, 5; 399/87

(56) References Cited

U.S. PATENT DOCUMENTS

| 5,077,680 | * | 12/1991 | Sturm et al. ........................... 358/1.5 |
| 5,625,892 | * | 4/1997 | Bauman et al. ........................ 455/69 |
| 5,729,708 | * | 3/1998 | Satoh et al. ........................... 395/872 |
| 5,819,111 | * | 10/1998 | Davies et al. ......................... 395/849 |
| 5,870,533 | * | 2/1999 | Takagi ................................. 358/1.15 |

FOREIGN PATENT DOCUMENTS

01106575 * 4/1989 (JP) .

* cited by examiner

Primary Examiner—Dov Popovici
(74) Attorney, Agent, or Firm—Fitzpatrick, Cella, Harper & Scinto (57) ABSTRACT

A data receiving apparatus which performs a handshake reception to set a busy signal upon reception of data and reset the busy signal upon storage of the received data in a buffer. The apparatus includes a busy extension unit and a reset control unit. The busy extension unit is for extending the set busy signal by a predetermined time period and resetting the busy signal after expiration of the predetermined time period, when a free capacity of the buffer becomes smaller than a first value in process of performing the handshake reception. The reset control unit enables the busy extension unit to reset the busy signal after expiration of the predetermined time period, if the free capacity of the buffer does not reach a second value during the predetermined time period, and for disabling the busy extension unit and resetting the busy signal prior to expiration of the predetermined time period, if the free capacity of the buffer does reach the second value during the predetermined time period.

12 Claims, 6 Drawing Sheets

RELEASE OF BUSY SIGNAL WHEN FREE CAPACITY OF A RECEPTION BUFFER EXCEEDS A PREDETERMINED AMOUNT

BACKGROUND OF THE INVENTION

1. Field of the Invention

The invention relates to a printer for printing on the basis of data from a host computer and, more particularly, to a printer for performing a hand-shake reception from a host computer.

2. Related Background Art

Hitherto, a printer for hand-shake receiving data from a host computer by hardware has: a memory (receiving buffer) for storing reception data; data holding means for transferring the reception data to the receiving buffer; data reading means for sequentially extracting the reception data from the receiving buffer; vacant capacity counter means for calculating a vacant capacity of the receiving buffer from a difference between the number of reception data held and the number of reception data read out; means for generating a /ACKNLG pulse as a response signal for performing the hand-shake reception by hardware and a BUSY signal; BUSY resetting means which is made operative by the /ACKNLG pulse; comparing means for comparing the vacant capacity value obtained by the vacant capacity counter means with a predetermined value; and BUSY extension means which is made operative by an output signal from the comparing means and extends a data reception BUSY period of time, wherein the vacant capacity value by the vacant capacity counter means and the predetermined value are compared by the comparing means and, when the vacant capacity value is below the predetermined value, a BUSY period of time at the time of the next data reception is extended by a predetermined time by the BUSY extension means.

According to the conventional apparatus as mentioned above, when the vacant capacity of the receiving buffer decreases, the BUSY period of time is extended and a data receiving pace is made slow, thereby adjusting a balance between the data receiving pace and a data reading pace and avoiding a situation such that the receiving buffer is filled with the data and the BUSY status continues for a long time and a device time-out process of the host computer operates.

Since the above conventional apparatus, however, has a construction such that the BUSY period of time is extended by the predetermined time, when the reception data reading pace for the BUSY extension period of time is fast, even if all of the reception data held in the receiving buffer is fully read out, the BUSY status is not released until the end of the extension time and a vain time in which none of the data reception and the reading operation of the reception data is performed occurs, so that there is a case where a throughput remarkably deteriorates.

As a countermeasure of such a problem, a method of examining the optimum value of the BUSY extension time and setting is considered. However, the data receiving pace largely changes in dependence on a performance and a data amount per line of a host computer, particularly, a printer driver built therein, that is, a difference between image data and text data or a difference between monochromatic data and color data, or the like, so that it is difficult to find out the optimum value.

To prevent such a drawback, therefore, a construction such that a proper time is enabled to be selected from a plurality of BUSY extension times and they can be switched in accordance with the type of host computer or data is also considered. However, means for discriminating the type of host computer or data has to be established and added. A problem such as large labor, increase in costs, or the like newly occurs.

On the other hand, the receiving data reading pace largely changes in dependence on printing conditions of the printer, data amount per line, or the like. Further, the capacity of the receiving buffer differs in dependence on the kind of printer, emulation mode, or the like. It is, therefore, difficult to find out the optimum BUSY extension period of time in which the vain time as mentioned above doesn't occur in the BUSY extension period of time.

SUMMARY OF THE INVENTION

According to an embodiment of the invention, there is provided a control apparatus for controlling an input of data from an external apparatus, comprising: receiving means for storing the data which is inputted from the external apparatus; output means for outputting a control signal indicating that the data cannot be inputted from the external apparatus to the receiving means; delay means for delaying an output time of the control signal by the output means; detecting means for detecting a capacity in which the data can be inputted from the external apparatus to the receiving means; and control means for controlling an interruption of an extension of the output time by the delay means on the basis of the capacity detected by the detecting means.

The above and other objects and features of the present invention will become apparent from the following detailed description and the appended claims with reference to the accompanying drawings.

DETAILED DESCRIPTION OF THE PREFERRED EMBODIMENTS

An embodiment of the present invention will now be described with reference to the drawings.

Figure 6:
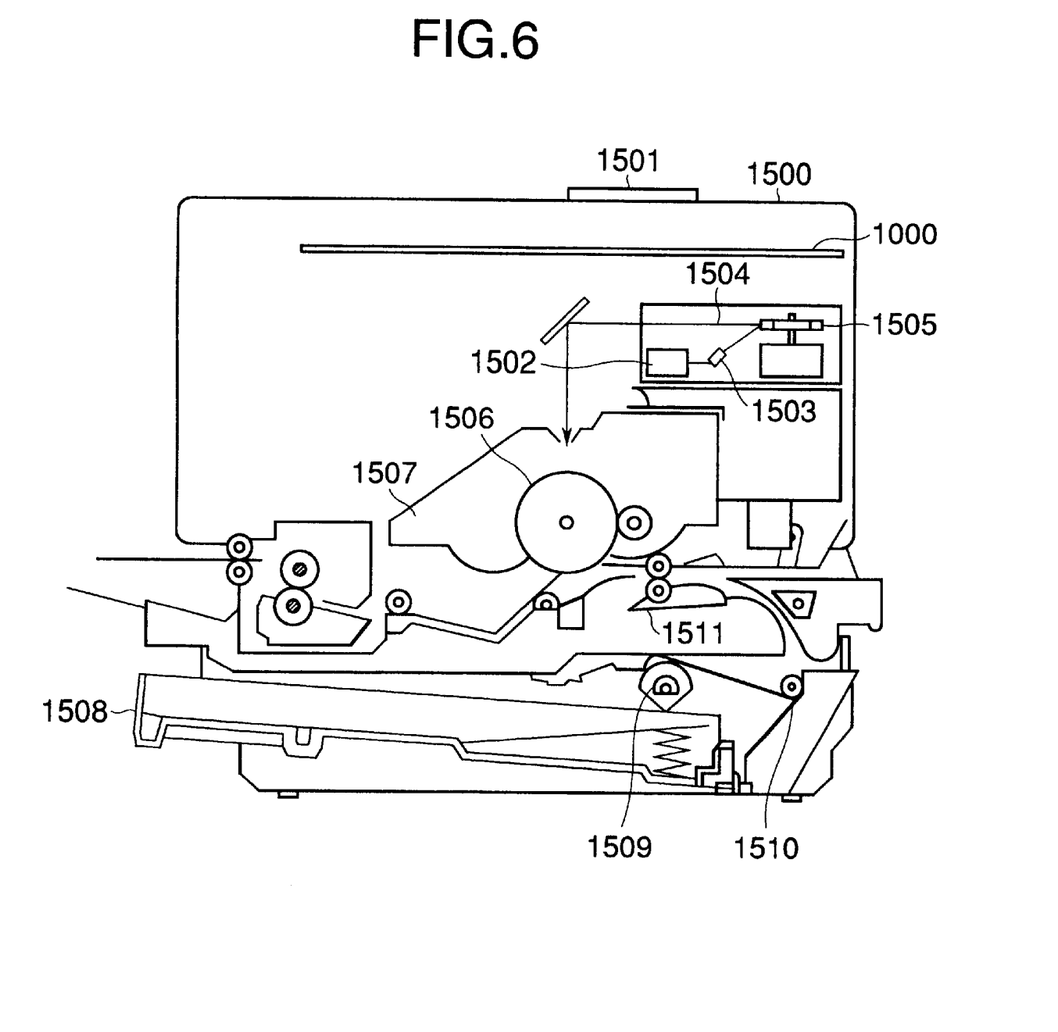
FIG. 6 is a diagram showing an outline of a laser beam printer as an example of an output apparatus to which the invention can be applied.

FIG. 6 is a cross sectional view showing a construction of a first output apparatus to which the invention can be applied and shows a case of, for instance, a laser beam printer (LBP).

In the diagram, reference numeral 1500 denotes an LBP main body for inputting and storing print information (character codes and the like), form information, macro instruction, or the like which is supplied from a host computer connected to the outside and generating a corresponding character pattern, a form pattern, or the like in accordance with those information, thereby forming an image onto a recording paper or the like as a recording medium. Reference numeral 1501 denotes an operation panel on which switches for operation, an LED display, and the like are arranged. Reference numeral 1000 denotes a printer control unit for controlling the whole LBP main body 1500 and analyzing character information or the like which is supplied from the host computer. The printer control unit 1000 mainly converts the character information into a video signal of the corresponding character pattern and outputs to a laser driver 1502. A printer interface unit, which will be explained hereinlater, is included in the printer control unit 1000. Data is received by a receiving buffer included in the printer control unit 1000 and the printing operation is controlled on the basis of the received data. The laser driver 1502 is a circuit to drive a semiconductor laser 1503 and switches the on/off operation of a laser beam 1504 which is irradiated from the semiconductor laser 1503 in accordance with the inputted video signal. The laser beam 1504 is swung to the right and left by a rotary polygon mirror 1505, thereby scanning and exposing onto an electrostatic drum 1506. Thus, an electrostatic latent image of the character pattern is formed on the electrostatic drum 1506. The latent image is developed by a developing unit 1507 arranged around the electrostatic drum 1506 and, thereafter, is transferred onto the recording paper. Cut sheets are used as recording papers. The cut sheet recording papers are enclosed in a sheet cassette 1508 attached in the LBP 1500 and are picked up and fed one by one into the apparatus by a feed roller 1509 and a carrier roller 1511 and supplied to the electrostatic drum 1506. The LBP main body 1500 has at least one or more card slots (not shown), so that an optional font card and a control card (emulation card) of a different language system can be connected to the LBP main body in addition to built-in fonts.

Figure 7:
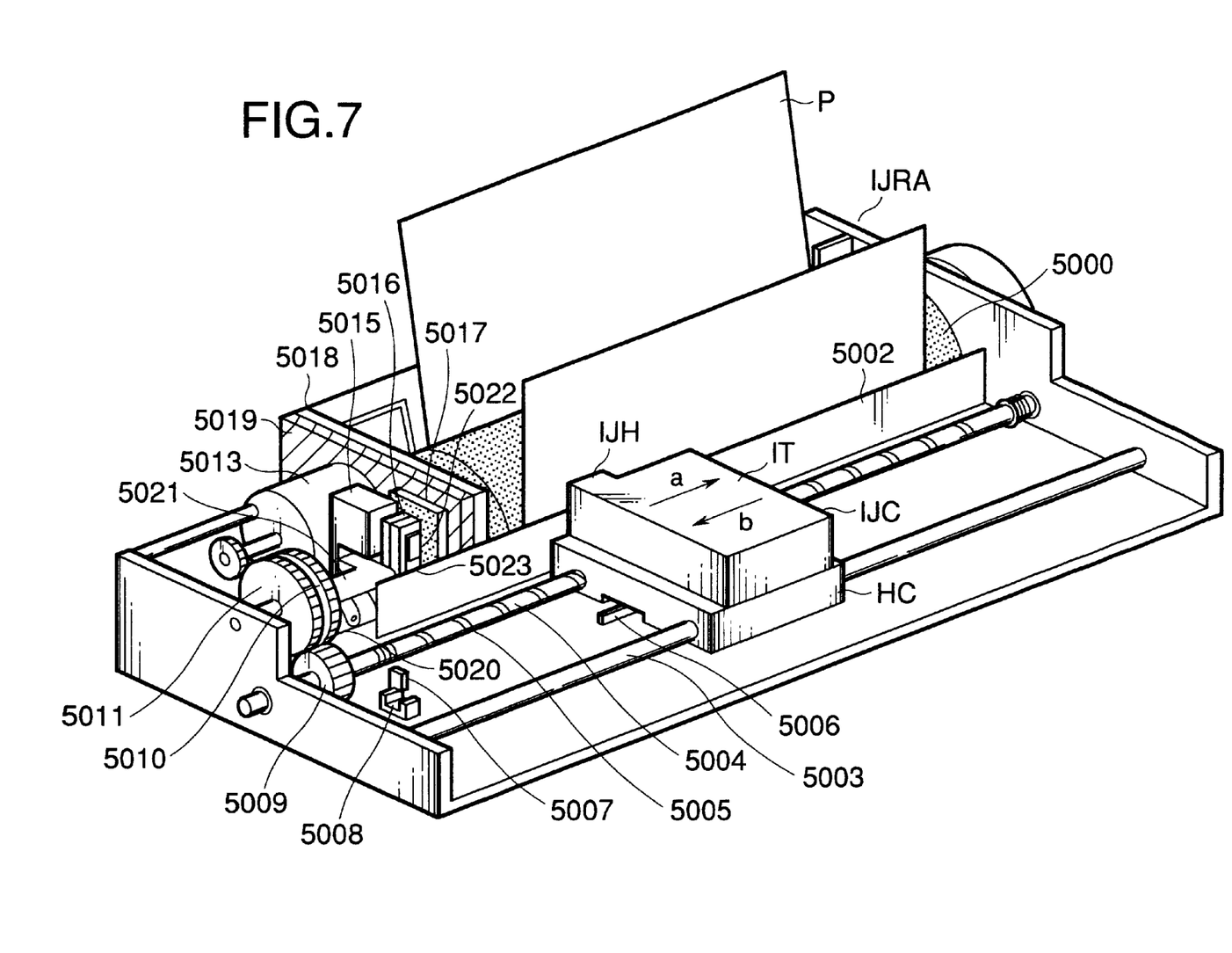
FIG. 7 is a diagram showing an outline of an ink-jet printer as an example of an output apparatus to which the invention can be applied.

FIG. 7 is an external view showing a construction of a second output apparatus to which the invention can be applied and shows a case of, for example, an ink-jet recording apparatus (IJRA).

In the diagram, a lead screw 5005 is rotated through driving force transfer gears 5011 and 5009 in an interlocked relation with the forward or reverse rotation of a driving motor 5013. A carriage HC is come into engagement with a spiral groove 5004 of the lead screw 5005. The carriage HC has a pin (not shown) and is reciprocated in the directions shown by arrows a and b. An ink jet cartridge IJC is mounted on the carriage HC. Reference numeral 5002 denotes a paper pressing plate for pressing the paper onto a platen 5000 in the carriage moving direction. Reference numerals 5007 and 5008 denote photocouplers which function as home position detecting means for confirming the existence of a lever 5006 of a carriage in a region of each photocoupler and executing the operation to switch the rotating direction of the motor 5013 or the like. Reference numeral 5016 denotes a member for supporting a cap member 5022 to cap the whole surface of a recording head; 5015 sucking means for sucking the air in the cap and for performing a sucking recovery of the recording head through an opening 5023 in the cap; 5017 a cleaning blade which can be moved in the front/rear direction by a member 5019; 5018 a main body supporting plate for supporting the cleaning blade 5017 and member 5019; and 5021 a lever for starting the sucking operation of the sucking recovery. This lever is moved in association with the motion of a cam 5020 adapted to be come into engagement with the carriage. The driving force from the driving motor is transferred by well-known transfer means such as switching of a clutch or the like.

A desired process of the capping, cleaning, and sucking recovery can be executed at a corresponding position by the operation of the lead screw 5005 when the carriage reaches a region on the home position side. However, it is sufficient to construct so as to perform a desired operation at a well-known timing.

Figure 8:
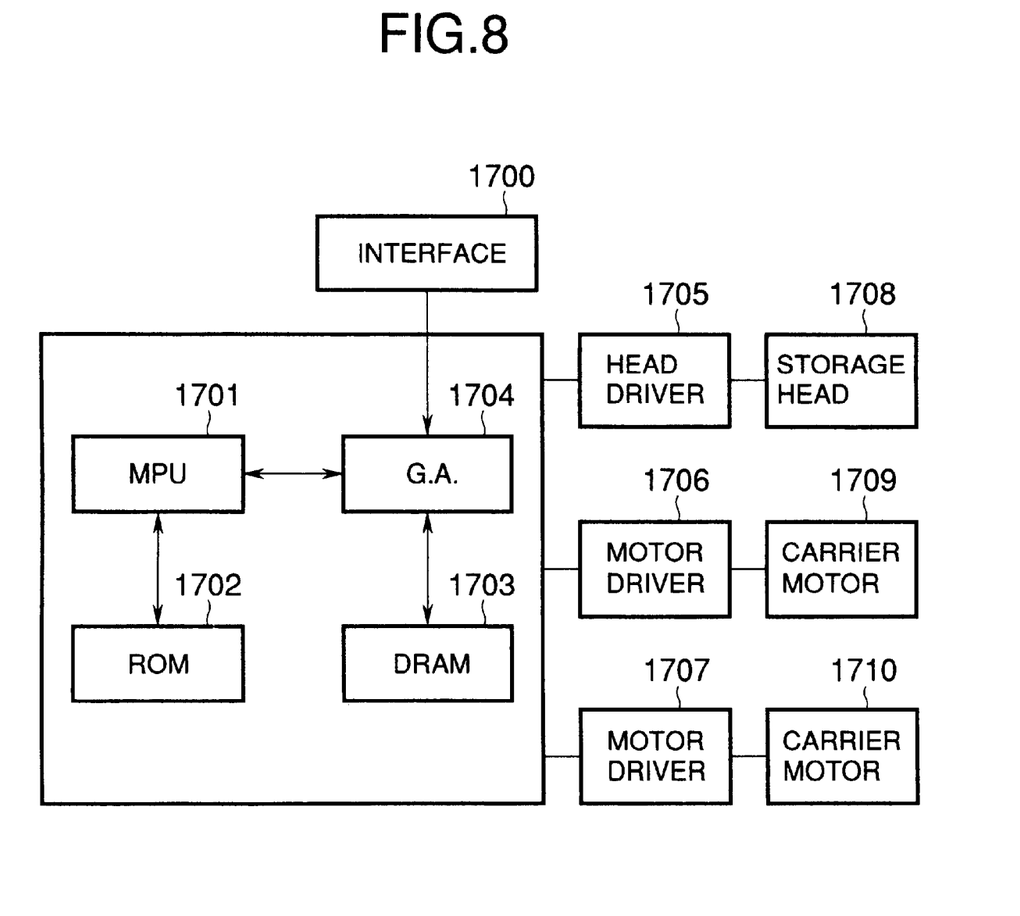
FIG. 8 is a block diagram showing a control construction of the ink-jet printer shown in FIG. 7.

FIG. 8 is a block diagram for explaining a control construction of the second output apparatus shown in FIG. 7.

In the diagram, reference numeral 1700 denotes an interface for inputting a recording signal from a host computer 3000; 1701 an MPU; 1702 an ROM for storing a control program that is executed by the MPU 1701, host print information, and the like; and 1703 a DRAM for storing various data (the foregoing recording signal, recording data which is supplied to the head, and the like). The data received through an interface 1700 is stored into a receiving buffer included in the DRAM 1703. An outline of the interface 1700 will be explained hereinlater. Reference numeral 1704 denotes a gate array for performing a supply control of output data to a recording head 1708 and for also performing a transfer control of data among the interface 1700, MPU 1701, and DRAM 1703. Reference numeral 1710 denotes a carrier motor for conveying the recording head 1708; 1709 a carrier motor for conveying the recording paper; 1705 denotes a head driver for driving the recording head; 1706 a motor driver for driving the carrier motor 1709; and 1707 a motor driver for driving the carrier motor 1710.

In the recording apparatus constructed as mentioned above, when input information is inputted from the host computer 3000, which will be explained hereinlater, through the interface 1700, the input information is converted into output information for printing between the gate array 1704 and MPU 1701. When the motor drivers 1706 and 1707 are driven, the recording head is also driven in accordance with the output information sent to the head driver 1705 and the printing operation is executed.

A control circuit which is used in the transmission and reception of the data in the printer control unit 1000 in the laser beam printer in FIG. 6 or in the interface 1700 of the ink-jet printer in FIG. 8 will now be described with reference to FIG. 1.

Although the control circuit is made up of component elements 1 to 7, they are controlled by a central processing unit such as CPU or MPU.

Figure 1:
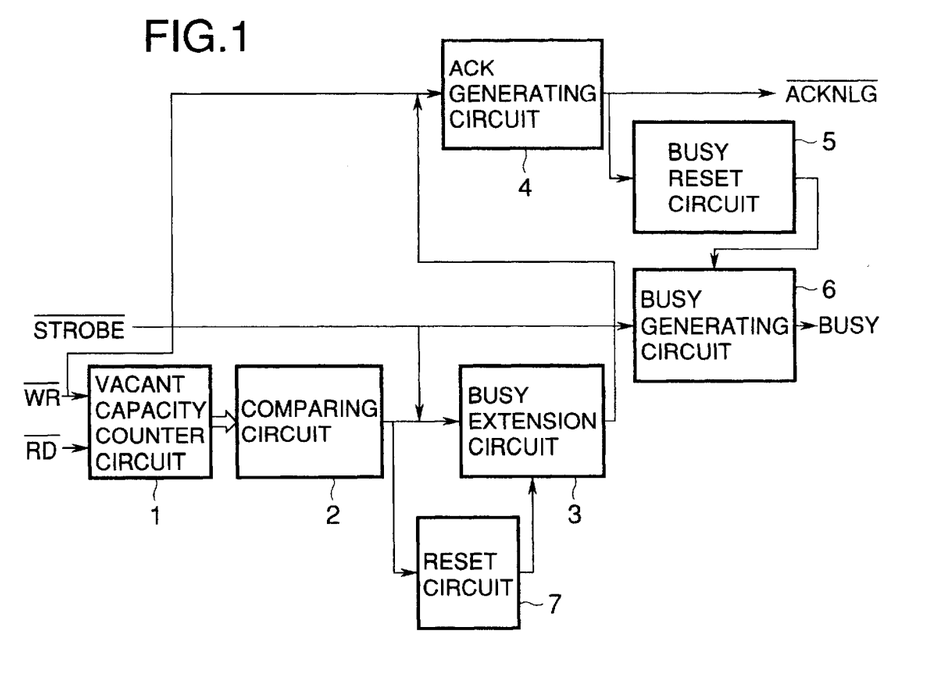
FIG. 1 is a block diagram of a control circuit of a printer according to an embodiment of the invention.

In detail, FIG. 1 is a control block diagram of a /ACKNLG signal as a response signal for hand-shake reception and a BUSY signal. The reception of data into the receiving buffer is controlled by such a hand-shake reception.

A symbol "/" written before the signal indicates that the signal is low active and is shown by an upper horizontal line written above the signal in the diagram.

In FIG. 1, reference numeral 1 denotes a vacant capacity counter circuit for counting a vacant capacity of the receiving buffer to hold the data that is transmitted from the host computer (not shown). For example, the counter circuit is constructed by an up/down counter. Reference numeral 2 denotes a comparing circuit for discriminating whether the vacant capacity of the receiving buffer is below a predetermined number; 3 a BUSY extension circuit for extending a time of the BUSY signal which is issued upon data reception by a predetermined time; 4 an ACK generating circuit; 5 a BUSY reset circuit for resetting a BUSY status; 6 a BUSY generating circuit; and 7 a reset circuit for resetting the BUSY extension circuit 3.

Figure 2:
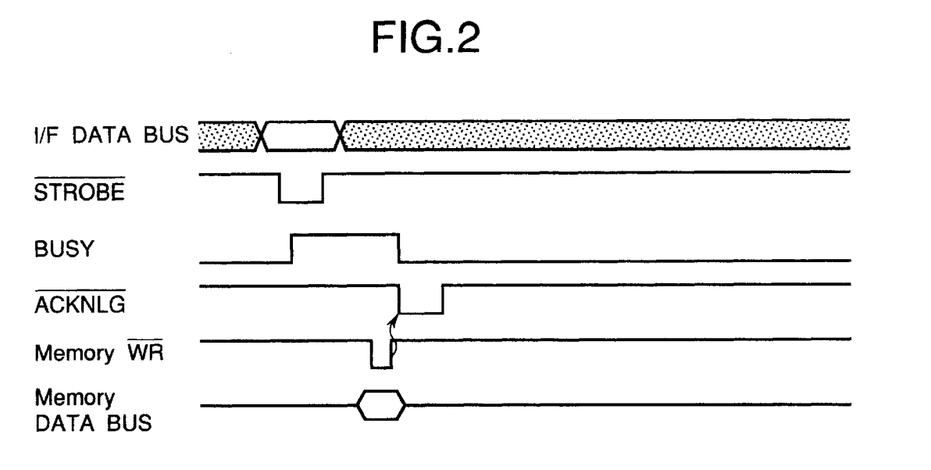
FIG. 2 is a timing chart showing an ordinary hand-shake reception.

In the above construction, when data of one byte is transmitted from the host computer together with a /STROBE pulse, the printer latches the data at a timing of a leading edge or a trailing edge of the /STROBE pulse. At the same time, the /STROBE pulse is inputted to the BUSY generating circuit 6 and the BUSY signal is set. When an internal signal /WR indicating that the latched data has been stored in the receiving buffer as a memory for holding is generated, a count value of the vacant capacity counter circuit 1 is increased by "−1" and the ACK generating circuit 4 operates (in response to the leading edge of the signal /WR) and generates the /ACKNLG pulse, thereby returning a message indicative of the data reception to the host computer. When the /ACKNLG pulse is generated, the BUSY generating circuit 6 is initialized by the BUSY reset circuit 5, so that the BUSY signal is reset. The above operation relates to the normal hand-shake reception and is shown in a timing chart of FIG. 2.

A data reception control and a slowdown reception in the case where the vacant capacity of the receiving buffer is below the predetermined value will now be described. An initial value of the count value of the vacant capacity counter circuit 1 indicates the capacity of the receiving buffer and is increased by "−1" each time one byte of the data from the host computer is stored into the receiving buffer. The count value is increased by "+1" each time the reception data is read out from the receiving buffer. Therefore, when the data receiving pace is faster than the data reading pace, the count value of the vacant capacity counter circuit 1 gradually decreases and is below a predetermined value (for example, 256 count). In this instance, an output signal of the comparing circuit 2 is set. In this state, when the data is transmitted from the host computer, a timer circuit of the BUSY extension circuit 3 is started by the /STROBE pulse.

Figure 3:
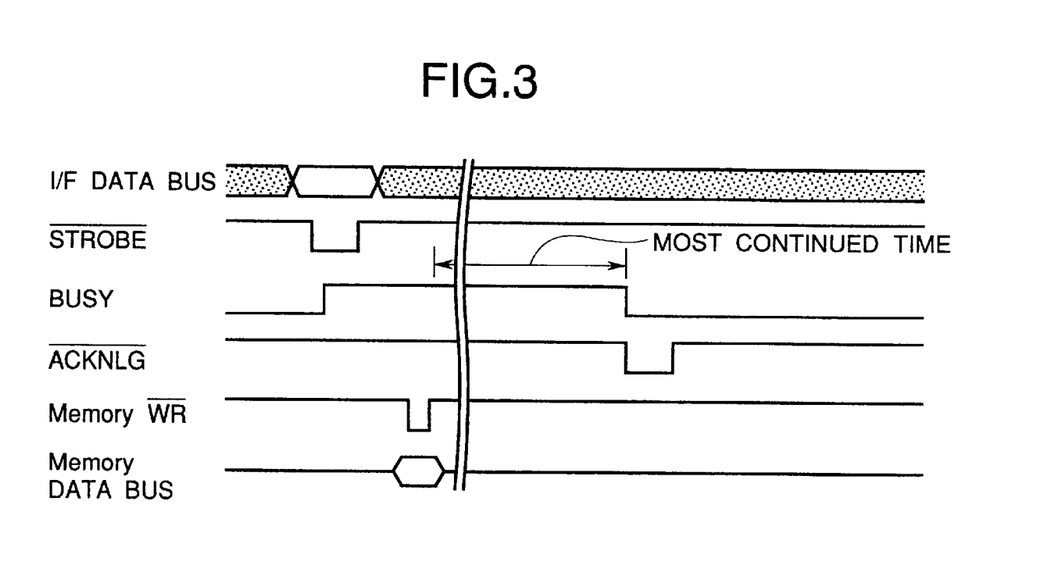
FIG. 3 is a timing chart for a slowdown reception in the case where a reception data reading pace is slow.

When the data from the host computer is stored into the receiving buffer, the /WR signal is generated as mentioned above. However, the ACK generating circuit 4 waits for the stop of the timer of the BUSY extension circuit 3, namely, after the elapse of the extension time, the ACK generating circuit 4 returns the /ACKNLG pulse to the host computer. A timing chart in this case is shown in FIG. 3.

Thus, the BUSY status is extended by the time of the timer of the BUSY extension circuit 3 each time the data of one byte is received, so that the receiving pace is made slow. Therefore, by reading out the reception data from the receiving buffer for such a slowdown period of time, the vacant capacity of the receiving buffer is recovered. When the count value of the vacant capacity counter circuit is equal to or larger than the predetermined value, the output signal of the comparing circuit 2 is reset, the operation of the BUSY extension circuit 3 is inhibited, and the foregoing normal hand-shake reception is executed.

When the data stored in the receiving buffer is read out, an internal signal /RD indicating that the data has been read out from the receiving buffer is generated and the count value of the vacant capacity counter circuit 1 is increased by "+1" as mentioned above. The read-out data is analyzed in accordance with the control program stored in the ROM and the printing operation is executed on the basis of the analysis result as shown in the description in FIGS. 6 to 8.

In the conventional construction, when the vacant capacity of the receiving buffer is below the predetermined value as mentioned above, by extending the BUSY status by the predetermined time every byte of the data, a balance between the data receiving pace and the data reading pace has been adjusted. As mentioned above, however, particularly, when the capacity of the receiving buffer is small, all of the reception data stored in the receiving buffer is fully read out until the middle of the BUSY extension period of time in dependence on the kind of data, so that there is a situation such that in spite of a fact that the receiving buffer is empty, no data can be received until the end of the BUSY extension time and the host computer has to be made wait.

According to the embodiment of the invention, therefore, by providing the reset circuit 7, such a problem is solved. As mentioned above, when the count value of the vacant capacity counter circuit 1 is below the predetermined value, the output signal of the comparing circuit 2 is set. In this state, when the data is transmitted from the host, the BUSY generating circuit 6 sets the BUSY signal by the /STROBE pulse. The BUSY extension circuit 3 starts the timer, thereby temporarily stopping that the /ACKNLG pulse is returned by the ACK generating circuit 4 even if the reception data was stored into the receiving buffer.

For such a period of time, the MPU of the printer sequentially reads out the reception data stored in the receiving buffer. The count value of the vacant capacity counter circuit 1 is increased by "+1" each time the reception data is read out. When the count value is equal to or larger than the predetermined value, the output signal of the comparing circuit is reset and the reset circuit 7 is made operative. When the timer of the BUSY extension circuit 3 is reset, the ACK generating circuit 4 in the temporary stop state is made operative and returns the /ACKNLG pulse to the host computer.

Figure 4:
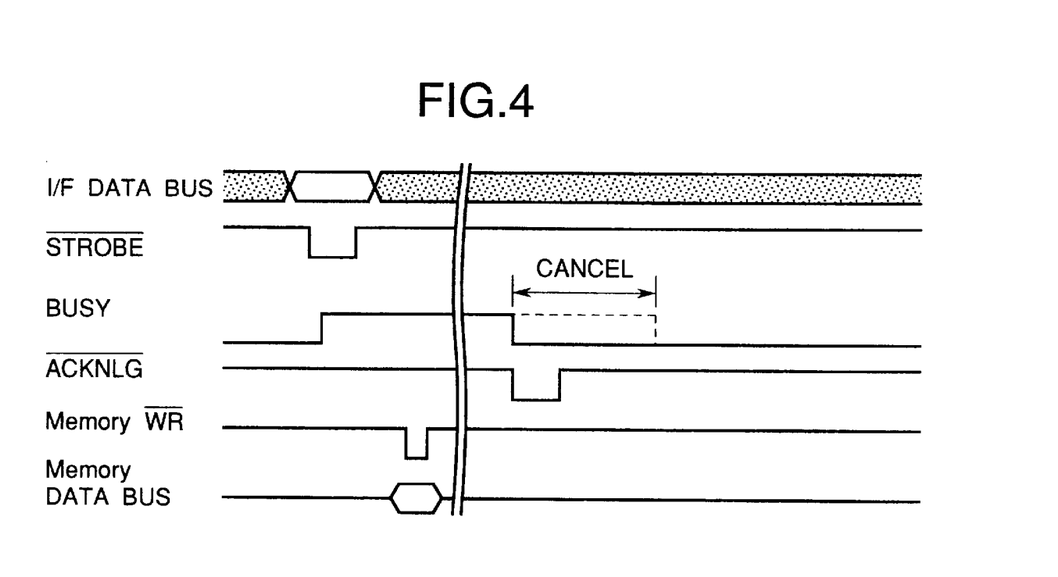
FIG. 4 is a timing chart for a slowdown reception in the case where the reception data reading pace is fast.

When the /ACKNLG pulse is generated, the BUSY reset circuit 5 operates, the output signal of the BUSY generating circuit 6 is reset, and the BUSY status is released, thereby enabling the apparatus to receive the data (refer to a timing chart of FIG. 4).

Figure 5:
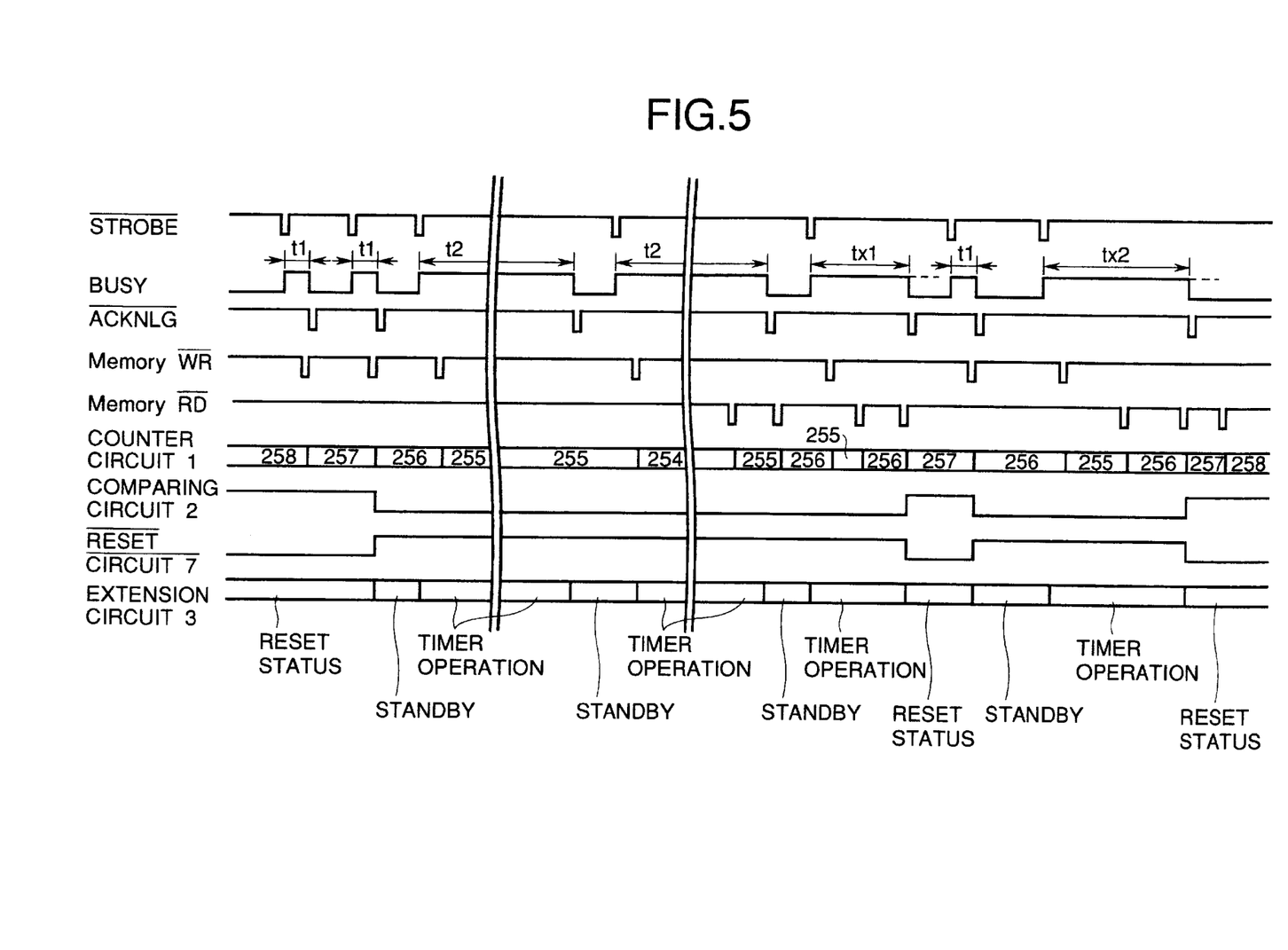
FIG. 5 is a timing chart for explaining further in detail the embodiment of the invention.

The embodiment of the invention will now be described further in detail with reference to FIG. 5. FIG. 5 is a timing chart showing output statuses of main signals and circuits, and the like. As compared with FIG. 4, FIG. 5 additionally shows output timings of the counter circuit 1, comparing circuit 2, reset circuit 7, and BUSY extension circuit 3. In FIG. 5, the reset circuit 7 holds the BUSY extension circuit 3 into the reset status for a period of time during which the vacant capacity is larger than a predetermined value (in the embodiment, 256 bytes). When the vacant capacity is equal to or less than the predetermined value (256 bytes), the reset circuit 7 sets the extension circuit 3 into an enable status. Since the BUSY extension circuit 3 doesn't operate in the reset status, the BUSY signal becomes an ordinary short pulse tl. In the enable status, the BUSY extension circuit 3 is first set into a standby status. When receiving the /STROBE pulse, the BUSY extension circuit 3 starts the timer operation. Unless the vacant capacity is recovered to 257 bytes or more during the timer operation, the BUSY signal is extended (t2) until the time-out. When the vacant capacity is recovered, an output signal of the reset circuit 7 is set to the low "L" level, the timer operation is cancelled in the middle of the operation, and the BUSY signal is set to the low level, thereby enabling the apparatus to receive the data ($t_x1$, $t_x2$).

Therefore, when the data reading pace is slower than the data receiving pace, the balance between them is adjusted by the conventional slowdown receiving function and, further, for the BUSY extension period of time by the slowdown receiving function, by making the BUSY extension time variable in accordance with the vacant capacity of the receiving buffer, the balance between the data receiving pace and the receiving data reading pace can be automatically adjusted. Therefore, even if the performance of the host computer, data amount, printing conditions of the printer, or the like changes, the capability of the printer can be always maximally effected without causing a problem such that the throughput remarkably deteriorates as in the conventional one.

In the embodiment, although the vacant capacity value of the receiving buffer at which the reset circuit 7 is made operative has been set to the same value as that in case of starting the slowdown reception, it is also possible to further add another comparing circuit and to set the vacant capacity value to another value.

According to the invention as described above, by providing the means for automatically adjusting the BUSY extension time for slowdown reception in accordance with the vacant capacity of the receiving buffer, the reception data reading pace during the slowdown reception can be optimized irrespective of the performance and data amount of the host computer, further, the capacity of the receiving buffer, printing conditions of the printer, or the like without losing the conventional slowdown receiving function by a fairly simple construction. There is, consequently, an advantage such that the performance of the printer can be maximally effected and the throughput can be improved.

What is claimed is:

1. A data receiving apparatus which performs a handshake reception to set a busy signal upon reception of data and reset the busy signal upon storage of the received data in a buffer, said apparatus comprising:

busy extension means for extending the set busy signal by a predetermined time period and resetting the busy signal after expiration of the predetermined time period, when a free capacity of the buffer becomes smaller than a first value in process of performing the handshake reception; and reset control means for enabling said busy extension means to reset the busy signal after expiration of the predetermined time period, if the free capacity of the buffer does not become equal to or larger than a second value during the predetermined time period, and for disabling said busy extension means and resetting the busy signal prior to expiration of the predetermined time period, if the free capacity of the buffer becomes equal to or larger than the second value during the predetermined time period.

2. An apparatus according to claim 1, wherein the first and second values are equal to each other.

3. An apparatus according to claim 1, wherein the first and second values are different from each other.

4. A printer which performs a handshake reception to set a busy signal upon reception of data and reset the busy signal upon storage of the received data in a buffer, said printer comprising:

busy extension means for extending the set busy signal by a predetermined time period and resetting the busy signal after expiration of the predetermined time period, when a free capacity of the buffer becomes smaller than a first value in process of performing the handshake reception; and reset control means for enabling said busy extension means to reset the busy signal after expiration of the predetermined time period, if the free capacity of the buffer does not become equal to or larger than a second value during the predetermined time period, and for disabling said busy extension means and resetting the busy signal prior to expiration of the predetermined time period, if the free capacity of the buffer becomes equal to or larger than the second value during the predetermined time period.

5. A printer according to claim 4, wherein the first and second values are equal to each other.

6. A printer according to claim 4, wherein the first and second values are different from each other.

7. A data receiving method which performs a handshake reception to set a busy signal upon reception of data and reset the busy signal upon storage of the received data in a buffer, said method comprising:

a busy extension step of extending the set busy signal by a predetermined time period and resetting the busy signal after expiration of the predetermined time period, when a free capacity of the buffer becomes smaller than a first value in process of performing the handshake reception; and a reset control step of enabling said busy extension step to reset the busy signal after expiration of the predetermined time period, if the free capacity of the buffer does not become equal to or larger than a second value during the predetermined time period, and for disabling said busy extension step and resetting the busy signal prior to expiration of the predetermined time period, if the free capacity of the buffer becomes equal to or larger than the second value during the predetermined time period.

8. A method according to claim 7, wherein the first and second values are equal to each other.

9. A method according to claim 7, wherein the first and second values are different from each other.

10. A data receiving apparatus comprising:

a busy set circuit adapted for setting a busy signal upon reception of data;

a busy reset circuit adapted for resetting the busy signal set by said busy set circuit upon storage of the received data in a buffer;

a busy extension circuit adapted for extending the set busy signal by a predetermined time period and resetting the busy signal after expiration of the predetermined time period, when a free capacity of the buffer becomes smaller than a first value in process of a handshake reception using said busy set circuit and said busy reset circuit; and a reset control circuit adapted for enabling said busy extension circuit to reset the busy signal after expiration of the predetermined time period, if the free capacity of the buffer does not become equal to or larger than a second value during the predetermined time period, and for disabling said busy extension circuit and resetting the busy signal prior to expiration of the predetermined time period, if the free capacity of the buffer becomes equal to or larger than the second value during the predetermined time period.

11. An apparatus according to claim 10, wherein the first and second values are equal to each other.

12. An apparatus according to claim 10, wherein the first and second values are different from each other.

* * * * *